(12) United States Patent
Kuijpers et al.

(10) Patent No.: US 11,141,909 B2
(45) Date of Patent: Oct. 12, 2021

(54) ADDITIVE MANUFACTURING DEVICE FOR MANUFACTURING A THREE DIMENSIONAL OBJECT

(71) Applicant: ADMATEC Europe B.V., Alkmaar (NL)

(72) Inventors: Petrus Adrianus Johannes Maria Kuijpers, Alkmaar (NL); Marijn Adrianus Johannes van Antwerpen, Alkmaar (NL)

(73) Assignee: Admatec Europe B.V., Alkmaar (NL)

( * ) Notice: Subject to any disclaimer, the term of this patent is extended or adjusted under 35 U.S.C. 154(b) by 153 days.

(21) Appl. No.: 15/743,676

(22) PCT Filed: Jul. 13, 2016

(86) PCT No.: PCT/EP2016/066613
§ 371 (c)(1),
(2) Date: Jan. 11, 2018

(87) PCT Pub. No.: WO2017/009368
PCT Pub. Date: Jan. 19, 2017

(65) Prior Publication Data
US 2018/0200948 A1 Jul. 19, 2018

(30) Foreign Application Priority Data

Jul. 15, 2015 (NL) ..................................... 2015169
Oct. 26, 2015 (NL) ..................................... 2015662

(51) Int. Cl.
*B29C 64/129* (2017.01)
*B29C 64/35* (2017.01)
(Continued)

(52) U.S. Cl.
CPC .......... *B29C 64/129* (2017.08); *B29C 64/124* (2017.08); *B29C 64/245* (2017.08);
(Continued)

(58) Field of Classification Search
CPC ... B29C 64/129; B29C 64/364; B29C 64/321; B29C 64/223; B29C 64/357
See application file for complete search history.

(56) References Cited

U.S. PATENT DOCUMENTS

| | | | |
|---|---|---|---|
| 5,248,249 A | 9/1993 | Yamamoto et al. | |
| 5,386,500 A | * 1/1995 | Pomerantz | ............. B33Y 50/02 345/419 |

(Continued)

FOREIGN PATENT DOCUMENTS

| | | |
|---|---|---|
| GB | 2246439 A | 1/1992 |
| JP | 63312130 A | 12/1988 |
| KR | 20160112797 A * 9/2016 | ............. B33Y 30/00 |

*Primary Examiner* — Katelyn W Smith
*Assistant Examiner* — Alexander D Booth
(74) *Attorney, Agent, or Firm* — N.V. Nederlandsch Octrooibureau; Catherine A. Shultz; Katelyn J. Bernier

(57) ABSTRACT

Additive manufacturing device for manufacturing a three dimensional object, having a foil substrate (2) and a resin depositor (4) for depositing a layer of curable resin (6) on a first side (2a) of the foil substrate (2), wherein the resin depositor (4) comprises an input side resin storage unit (5). A radiation source (10) is present for radiation curing the resin layer (6) on the first side (2a) of the foil substrate (2), wherein a cured resin layer (6) represents a cross sectional slice of a three dimensional object (12). A stage (9) is configured to hold a stacked arrangement of one or more cured resin layers representing at least in part the three dimensional object (12), and a positioning system is provided for relative positioning the foil substrate (2) and the stage (9). A resin conditioning unit (16) is provided upstream from the input resin storage unit (5).

18 Claims, 3 Drawing Sheets

(51) Int. Cl.
  *B29C 64/124* (2017.01)
  *B29C 64/321* (2017.01)
  *B29C 64/364* (2017.01)
  *B29C 64/357* (2017.01)
  *B29C 64/245* (2017.01)
  *B33Y 30/00* (2015.01)
  *B33Y 40/00* (2020.01)

(52) U.S. Cl.
  CPC ............ *B29C 64/321* (2017.08); *B29C 64/35* (2017.08); *B29C 64/357* (2017.08); *B29C 64/364* (2017.08); *B33Y 30/00* (2014.12); *B33Y 40/00* (2014.12)

(56) References Cited

U.S. PATENT DOCUMENTS

| | | | |
|---|---|---|---|
| 5,879,489 A * | 3/1999 | Burns | B29C 64/147 156/64 |
| 6,004,124 A * | 12/1999 | Swanson | B29C 48/05 425/375 |
| 2002/0090410 A1* | 7/2002 | Tochimoto | B29C 64/321 425/215 |
| 2005/0208168 A1* | 9/2005 | Hickerson | B29C 64/295 425/174.4 |
| 2011/0030804 A1 | 2/2011 | Schlienger et al. | |
| 2011/0309554 A1 | 12/2011 | Liska et al. | |
| 2012/0225208 A1* | 9/2012 | Tanaka | B41J 2/14016 427/265 |
| 2015/0367447 A1* | 12/2015 | Buller | B29C 64/35 219/74 |
| 2016/0303795 A1* | 10/2016 | Liu | B29C 67/0085 |
| 2016/0332386 A1* | 11/2016 | Kuijpers | B33Y 30/00 |
| 2017/0291362 A1* | 10/2017 | Tombs | G03G 15/224 |
| 2018/0043619 A1* | 2/2018 | Kim | B33Y 30/00 |

* cited by examiner

ADDITIVE MANUFACTURING DEVICE FOR MANUFACTURING A THREE DIMENSIONAL OBJECT

FIELD OF THE INVENTION

The present invention relates to an additive manufacturing device, in particular to resin handling components for the additive manufacturing device.

PRIOR ART

US patent publication US2011/0309554 discloses a device for processing a light-polymerizable material for building up an object in layers. In an embodiment the device comprises a rotatable disposed vat, a build platform disposed above the vat for building up the object, a feed device for feeding light-polymerizable material into a bottom of the vat, a light modulator and a further exposure unit below and above the build platform, respectively. The device may further comprise an application device, e.g. a doctor blade, arranged between the feed device and the build platform in a direction of rotation of the vat for smoothening the light-polymerizable material to a prescribed layer thickness. Also, a wiper may be arranged behind the light modulator and above the vat for collecting the material from the bottom of the vat and carrying it away or returning it into the feed device, which should take place at the end of a building process. During a building process, when it is raised slightly with respect to the bottom of the vat, the wiper serves the purpose of distributing the material again, in particular pushing the material back into the "holes" that have been created in the layer of material by the exposure process after raising of the build platform. In an alternative embodiment, the device may comprise a linearly moving vat in a back and forth manner instead of a rotating vat.

Japanese patent publication JP-S63-312130 discloses an additive manufacturing system wherein a fluid substance is applied in the form of a thin film on a transparent sheet, which transports the film of fluid substance to a light energy radiation surface for exposing the fluid substance.

American patent publication US2011/030804 discloses an additive manufacturing system having a vat with curable resin and a vertically moving platform suspended within the vat, such that new layers can be formed on top of the object being formed. A distribution member is provided for obtaining a fresh layer of curable resin on top of the object being formed. A fluid moving device (pump) is in communication with the distribution member, and an embodiment is disclosed where a filter is connected to the fluid moving device.

SUMMARY OF THE INVENTION

The present invention seeks to provide an improved additive manufacturing device providing an increased curable resin efficiency and a reduced resin waste stream. The additive manufacturing device is also less susceptible to layer scratching during layer to layer buildup of a three dimensional object.

According to the present invention, an additive manufacturing device of the type defined in the preamble is provided, comprising a foil substrate and a resin depositor for depositing a layer of curable resin on a first side of the foil substrate, the foil substrate being supported by a support plate, and wherein the resin depositor comprises an input side resin storage unit, a radiation source for radiation curing the resin layer on the first side of the foil substrate, wherein a cured resin layer represents a cross sectional slice of a three dimensional object, a stage configured to hold a stacked arrangement of one or more cured resin layers representing at least in part the three dimensional object, a positioning system for relative positioning the foil substrate and the stage, and a resin conditioning unit upstream from the input side resin storage unit (or resin depositor), a resin collection unit arranged to collect unused curable resin from the substrate, wherein the resin conditioning unit is in communication with the resin collection unit and input side resin storage unit.

The additive manufacturing device of the present invention ensures that desired characteristics such as chemical composition, viscosity, humidity, particle size, and/or temperature of the resin are maintained and/or modified for a particular application. E.g. it avoids an excess of suspended particles and solids above a predetermined size in layer of curable resin used. As a result, a smooth and uniform layer of curable resin will be deposited for each layer, as a result of which the cured layers, and eventually the produced three dimensional object, will be of a higher quality. This embodiment may be implemented using appropriate tubing for connecting the resin conditioning unit to the resin collection unit and the input side resin storage unit, thereby allowing reuse and conditioning of the resin for next and subsequent layers of a three dimensional object. Furthermore, the resin conditioning unit is arranged to allow for different resin colours as well as one or more different resin materials, e.g. multi resin material processing, which may be advantageous for obtaining one or more different resin layers having advantageous and/or desired characteristics (e.g. thickness).

In an embodiment, the resin conditioning unit may further comprise a pump unit in communication with the resin collection unit and the input side resin storage unit, e.g. in the form of a peristaltic pump, for directly providing a resin flow path from the resin collection unit back to the input side resin storage unit.

Temperature control of the curable resin may be provided in an advantageous embodiment through a temperature control system being part of the resin conditioning unit, so that an optimal temperature of the resin can be guaranteed for a particular application.

In an embodiment, the resin conditioning unit may further comprise a resin viscosity control system to facilitate depositing a thin layer of curable resin of a required thickness on the foil substrate by accurately controlling the viscosity of the curable resin.

In an advantageous embodiment, the resin conditioning unit may further comprise a resin humidity control system to ensure that a required humidity level of the resin is maintained and/or modified during an additive manufacturing process.

Further, the resin conditioning unit may be provided with a resin composition control system whereby a required chemical composition can be attained, maintained and/or modified according to particular requirements of an application.

The resin collection unit may comprise a scraper in a further embodiment, which in operation is in contact with the foil substrate, in order to effectively remove left over resin from the foil substrate. This would also allow reuse of the foil substrate (e.g. using a looped foil substrate).

The resin depositor in a further embodiment comprises a variable height blade (e.g. implemented as a doctor blade) for providing the layer of curable resin on the foil substrate. This allows accurate and consistent deposition of the layer of curable resin.

In order to guarantee that suspended particles in the resin do not exceed a particular size, an advantageous embodiment is provided wherein the resin conditioning unit comprises a filter unit. The filter unit may be arranged to ensure that suspended particles in a resin layer have a size not exceeding e.g. a layer thickness used on the foil substrate, thereby avoiding scratches and/or other layer irregularities during the manufacturing process.

In a further embodiment, the filter unit has a filter aperture size which is smaller than a thickness of the layer of curable resin, e.g. less than 50 µm or even less than 10 µm). To achieve this, the filter unit may comprise a sieve, a mesh filter, a (wire) gauze, etc.

The radiation source comprises a single projector in a further embodiment. The single projector, e.g. a 4K beamer or DLP beamer, can project the desired layer structure directly in one exposure, such that no complex operations are needed with multiple (part) exposures and alignment.

In an even further embodiment, the additive manufacturing device further comprises a foil flattening device for keeping the foil substrate flat onto the support plate. The foil flattening device is e.g. implemented as a vacuum device, with suitable apertures or slits in the support plate, e.g. only around image area). Alternatively or additionally the foil flattening device comprises a blower directed between the foil substrate and the support plate for loosening the foil substrate before moving the foil substrate for manufacturing a further layer.

SHORT DESCRIPTION OF DRAWINGS

The present invention will be discussed in more detail below, using a number of exemplary embodiments, with reference to the attached drawings, in which FIG. 1 shows an embodiment of an additive manufacturing system according to the present invention;

DETAILED DESCRIPTION OF EXEMPLARY EMBODIMENTS

Figure 1:
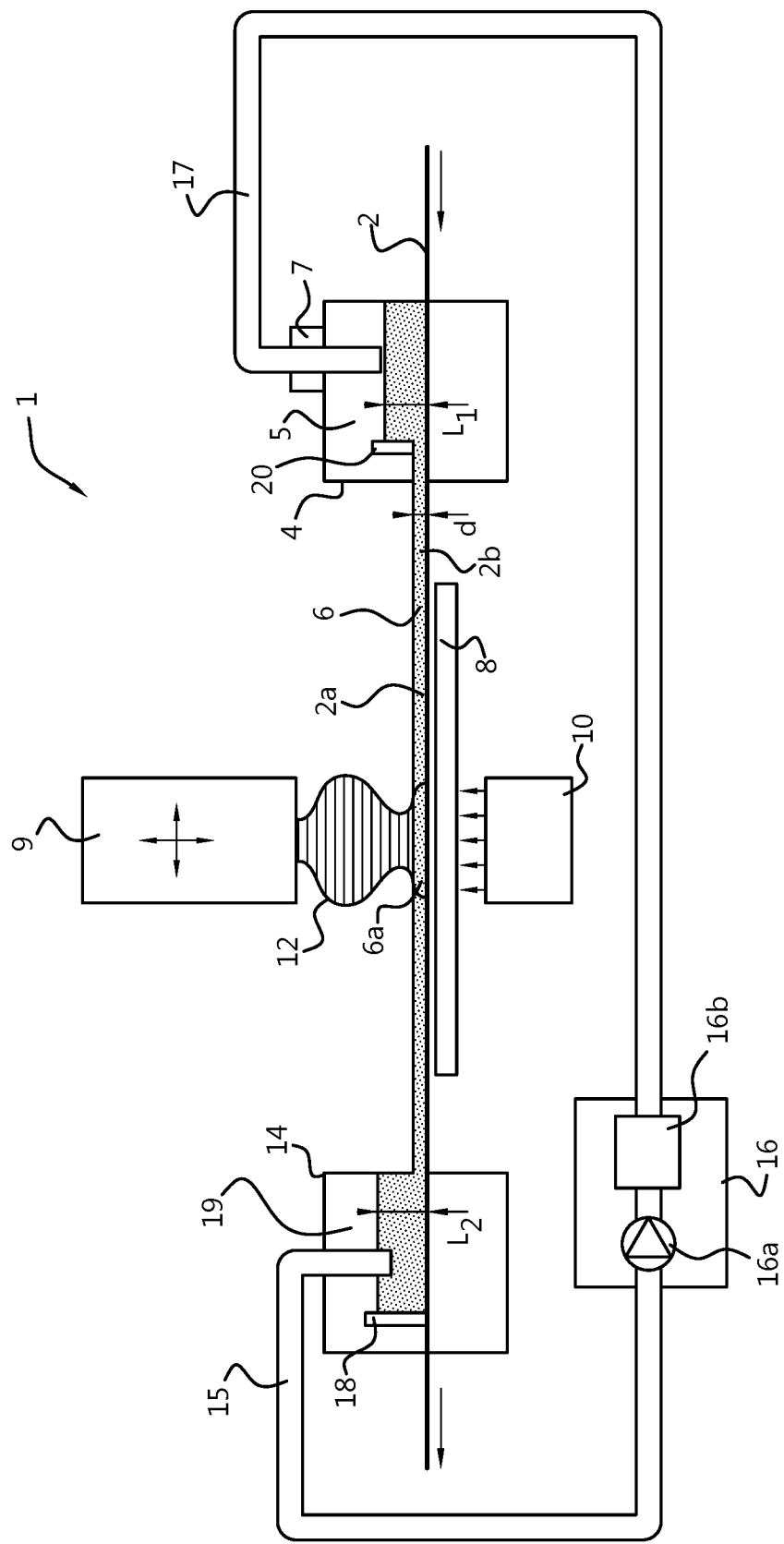

FIG. 1 shows an embodiment of an additive manufacturing system according to the present invention. In the embodiment shown, the additive manufacturing device 1 comprises a foil substrate 2 and a resin depositor 4 for depositing a layer of curable resin 6 on a first side 2a of the foil substrate 2, wherein the resin depositor 4 comprises an input side resin storage unit 5. The input side resin storage unit 5 is operable to provide a continuous and sufficient supply of curable resin 6 onto the foil substrate 2. The foil substrate 2 is supported by a support plate 8 and is movable over a surface of the support plate 8.

For clarity, the term "curable resin" should be construed as a viscous material that can be solidified through exposure to radiation, wherein "radiation" may be e.g. visible light radiation, ultraviolet radiation or infrared radiation. An example of a curable resin is a light-polymerizable material such as photopolymers comprising ceramic particles.

Further, a radiation source 10 for radiation curing of the resin layer 6 is provided on a second side 2b of the foil substrate 2, which in the embodiment as shown in FIG. 1 is transparent to the type of radiation used. A cured resin layer 6a represents a cross sectional slice of a three dimensional object 12 to be manufactured. In an alternative embodiment, as depicted in FIG. 1, the radiation source 10 may be arranged at the first side 2a of the foil substrate 2.

Since a three dimensional object is manufactured by consecutively adding cured layers, a stage 9 is provided configured to hold a stacked arrangement of one or more cured resin layers representing at least in part the three dimensional object 12. To position the foil substrate 2 with respect to the stage 9 there is provided a positioning system for relative positioning of the foil substrate 2 and the stage 9. In an embodiment the positioning system may also provide relative positioning of the support plate 8 and/or the radiation source 10 with respect to the stage 9, as indicated by arrows in FIG. 1.

In a typical embodiment the stage 9 is movably disposed substantially perpendicular to the support plate 8 for, e.g., pulling a cured resin layer or cross sectional slice 6a away from the foil substrate 2. Such a cured resin layer 6a forms a cross sectional slice of the object 12 being additively manufactured by stacking one or more of such cured resin layers 6a, and pulling each of such a cured layer away from the foil substrate 2 once the solidification has finished. The stage 9 may also be configured to bring the object 12 back into contact with a 'fresh' resin layer 6 at a predetermined distance from the foil substrate 2 before exposure to radiation, after which the solidification process can be repeated. In this way a stacked arrangement of adhesively and/or fused cured resin layers 6a is obtained representing the three dimensional object 12.

The additive manufacturing device 1 further comprises a resin conditioning unit 16 upstream from the input side resin storage unit 5, or possibly the resin depositor 4. An important advantage of the resin conditioning unit 16 according to the present invention is that resin conditioning of curable resin 6 takes place according to particular specification(s) to improve layer quality of each deposited and cured resin layer 6a, resulting in a higher quality of the final three dimensional object 12. In particular, the resin conditioning unit 16 ensures that, e.g., desired characteristics such as chemical composition, viscosity, humidity, particle size, and/or temperature etc. of the resin are maintained and/or modified according to particular specifications.

In an advantageous embodiment, the additive manufacturing device 1 further comprises a resin collection unit 14 wherein the resin conditioning unit 16 is in communication with the resin collection unit 14 and the input side resin storage unit 5.

This embodiment allows, that unused curable resin 6 is collected from the substrate 2 and fed back to the resin depositor 4, e.g. the input resin storage unit 5. An important advantage of this embodiment is that continued recycling of curable resin 6 takes place, resulting in lower material cost for producing a three dimensional object 12. In particular, for each cross sectional slice of an object 12 to be manufactured, excess curable resin disposed around the cured resin layer 6a is immediately fed into the resin collection unit 14 when the foil substrate 2 moves along the support plate 8 to the resin collection unit 14 as new, curable resin 6 is being supplied underneath the stage 9 and object 12 by the resin depositor 4. The resin conditioning unit 16 ensures that any desired resin quality can be maintained and/or modified during an additive manufacturing process.

In an embodiment, the resin conditioning unit 16 further comprises a pump unit 16a in communication with the input side resin storage unit 5, thereby allowing sufficient resin flow for an uninterrupted additive manufacturing process.

In an embodiment, the resin collection unit 14 and resin depositor 4 are connected by a tubular feed line comprising a downstream feed line 15 and an upstream feed line 17, wherein the resin conditioning unit 16, in particular the pump unit 16a, is disposed there between.

In an embodiment the downstream and upstream feed line 15, 17 comprise a flexible or rigid material or any combination thereof, depending on requirements.

In a further embodiment, the pump unit 16a is a diaphragm pump, peristaltic pump or any other pump type suitable for pumping a curable resin, e.g. a highly viscous curable resin.

In light of the invention, the resin conditioning unit 16 may further comprise a filter unit 16b. The filter unit 16b may be connected to a resin feed stream. The filter unit 16b ensures that the curable resin 6 on the foil substrate 2 does not comprise solids or particles larger than a predetermined size. For example, in an advantageous embodiment the filter unit 16b is configured to filter particles having a largest cross sectional size exceeding a predetermined value, e.g. related to a layer thickness d of the curable resin 6. So for a resin layer thickness d of e.g. 30 µm, the filter unit 16b may be arranged to filter or retain all solids and particles having a cross sectional size exceeding 30 µm. Generally speaking, particle sizes in the layer of curable resin 6 should not exceed the layer thickness d thereof on the foil substrate 2. The filter unit 16b thus prevents the formation of uneven parts such as lines on a new layer of curable resin 6 when it is fed on the substrate 2 underneath the previously cured resin layer 6a. Also, as the filter unit 16b limits the size of particles in the layer of curable resin 6, surface roughness of a cured resin layer or cross sectional slice 6a is minimized.

In an alternative embodiment, a further filter unit 7 may be provided directly connected to the input side resin storage unit 5 (as shown in FIG. 1), in addition to or in place of the filter unit 16b as part of the resin conditioning unit 16. The features described herein relating to the filter unit 16b may be applied in a similar fashion to the further filter unit 7.

It is important to note that the resin conditioning unit 16 need not be arranged as a separate unit. That is, in alternative embodiments the resin conditioning unit 16 may be part of or be integrated in the resin depositor 4 or the input side resin storage unit 5. It is even conceivable that in a further alternative embodiment the resin conditioning unit 16 is a part of or is integrated in the resin collection unit 14. So in light of the present invention, the resin conditioning unit 16 can in principle be arranged and/or integrated anywhere within the additive manufacturing device 1 if so desired and/or required according to specifications.

Filtering capacity of the filter unit 16b may also be expressed through a filter aperture size indicating a maximum size of suspended solids or particles in a resin stream capable of traversing the filter unit 16b into the resin depositor 4 and onto the foil substrate 2. For example, in an embodiment, the filter unit 16b has a filter aperture size which is smaller than a thickness of the layer of curable resin 6, e.g. less than 50 µm, e.g. less than 30 µm. The filter unit 16b thus guarantees that particle sizes in a layer of curable resin 6 do not exceed the layer thickness d, thereby providing a uniform and even layer of curable resin 6 on the substrate 2. This will also prevent scratch marks or the like on a previously cured layer 6a as well as reducing surface roughness of a cured resin layer 6a. Note that a cured resin layer 6a will in general be much thinner than the thickness of the layer of curable resin 6 transported on the foil substrate 2 to the exposure position, as the stage 9 presses the three dimensional object 12 into the fresh layer of curable resin 6. The cured resin layer 6a is e.g. only half of the layer or curable resin 6 on the foil substrate 2. The filter unit 16b may be comprise a sieve, a mesh filter, a wire mesh, or a closely perforated piece of material, e.g. metal, plastic, etc.

When starting to produce a three dimensional object using the additive manufacturing system 1 of the present invention, a first plain layer of a cured resin layer 6a may be formed on the stage 9, e.g. by exposing an entire image forming part of the support plate 8 with radiation. Alternatively, it would be possible to provide the stage 9 with a first layer of resin and cure it to a sufficiently flat full first layer using a proper radiation source even before the stage 9 is mounted in the system 1. This could be effected e.g. by using an external radiation source, or simply by holding the stage 9 with the first layer of uncured resin above the (transparent) support plate 8 and performing a full plate exposure. This will allow an easier and more reliable build-up of the object 12 in a layer-by-layer fashion, e.g. allowing to use studs, bridges and the like for temporarily supporting the object 12 during manufacturing. The full first layer can later be removed from the manufactured object (together with the studs, bridges and other support elements. The first plain layer of cured resin is provided in a uniform and even manner (i.e. parallel and same uniform thickness over its entire surface). This may alternatively be accomplished using a dedicated tool, using a fixed stage and a separate foil substrate holding an amount of uncured resin. A flat plate can then be used to press the uncured resin and the foil substrate against the stage such that a uniform layer of even thickness is obtained. Further exposure elements (e.g. using light sources all around) can then be used to cure the uncured resin.

Alternatively, the first layer is formed by temperature induced curing of the first layer directly adjacent the stage 9, e.g. using a direct or indirect temperature control of the support plate 8 (e.g. using infrared radiation, heated air, etc.). In this case, a resin is used which comprises a thermal activator. An even further alternative can be envisaged, wherein the first layer is provided using chemical bonding techniques.

In an embodiment, the filter unit 16b may be disposed in the upstream feed line 17 between the pump unit 16a and the resin depositor 4. In an alternative embodiment the filter unit 16b is disposed in the downstream feed line 15 between the resin collection unit 14 and the pump unit 16a. It may be envisaged that the filter unit 16b comprises a plurality of filter members, wherein the downstream and upstream feed line 15, 17 each comprise a filter member, for example. The plurality of filter members may each have a different filter aperture size, e.g. a decreasing filter aperture size from the downstream feed line 15 to the upstream feed line 17 or vice versa. Having a filter member in the downstream feed line 15 may increase durability of the pump unit 16a.

To further promote optimal resin quality, a group of embodiments is provided wherein the resin conditioning unit 16 further comprises a resin temperature control system, a resin viscosity control system, a resin humidity control system, and/or a resin ingredient or composition control system. Each embodiment alone or in combination allows for optimal control and regulation of resin quality throughout the additive manufacturing process, so that the layer of curable resin 6 meets specifications as required by a particular application.

In a further embodiment, multiple resin conditioning units 16 are provided in the additive manufacturing device, with associated resin depositors 4 and resin collection units 14. Each combination can then provide for a layer of curable resin with specific material properties, allowing multi-material additive manufacturing of a three dimensional object.

In an embodiment the resin collecting unit 14 comprises a scraper 18, which allows excess resin to be scraped from the foil substrate 2 for further use. In a desirable scenario, all of the curable resin left on the foil substrate 2 after retrieving the object 12 with a fresh cured resin layer 6a, is removed from the foil substrate 2 by the scraper 18, thereby maximizing curable resin efficiency and minimizing a resin waste stream. In order to remove resin from the foil substrate 2, an embodiment is provided wherein the scraper 18 is in contact engagement with the foil substrate 2 along a width thereof, and possibly at an angle to the first surface 2a of the foil substrate 2. The scraper 18 may be embodied as a scraping blade extending across the foil substrate 2.

The scraper 18 may be implemented in various embodiments, e.g. as a straight, flexible material blade type of scraper 18. In a further advantageous embodiment, as shown in the bottom view of FIG. 3, the resin collection unit 14 comprises a suction aperture 14a, and the scraper 18 has a curvature (in the plane of the bottom side of the resin collection unit 14, i.e. parallel to the foil substrate 2 during operation). The suction aperture 14a is located centrally with respect to the curvature of the scraper 18, as a result of which the remaining slurry of the foil substrate 2 will aggregate against the scraper 18 during operation, and form a kind of a well around the suction aperture 14a, allowing a proper recirculation of the slurry (e.g. using reconditioning unit 16 as discussed above). Furthermore it has been proven that the curved embodiment of scraper 18 allows a more even pressure to be exerted on the foil substrate 2, resulting in less chance of the foil substrate 2 to start wrinkling and/or crinkling under the slurry collection unit 14 during actual use. Also, because of the positioning of the various elements, it is less likely that slurry will leak out of the resin collection unit 14 at the sides thereof. In addition to the prevention of slurry remaining on the used foil substrate 2 by using the scraper 18, this curved embodiment of the scraper 18 will ensure an even more efficient use of slurry in the present invention embodiments of the additive manufacturing device.

It is noted that the term curvature in relation to the scraper 18 is meant to also include a straight middle part (e.g. over the width of suction aperture 14a) with curved side parts, providing similar advantages as described above.

Further embodiments of the slurry collection unit 14 have a scraper 18 which spans a width larger than the slurry width on the foils substrate 2 during use. Furthermore it has been found that a curvature of the scraper with a radius of less than about 250 mm provides good results, e.g. a radius of 110 mm has proven to provide very good results in collecting all the remaining slurry on the foils substrate 2 under varying circumstances of printing.

In an even further embodiment, at least one additional scraper pair 18a is positioned upstream of the scraper 18 on the bottom surface of the slurry collection unit 14, wherein the additional scrapers of the at least one additional scraper pair 18a are positioned mirror symmetric of the longitudinal centerline of the slurry collection unit 14. The at least one additional scraper pair 18a and the (main) scraper 18 than advantageously overlaps at the sides to improve collection of the remaining slurry towards the centrally located suction aperture 14a.

Figure 3:
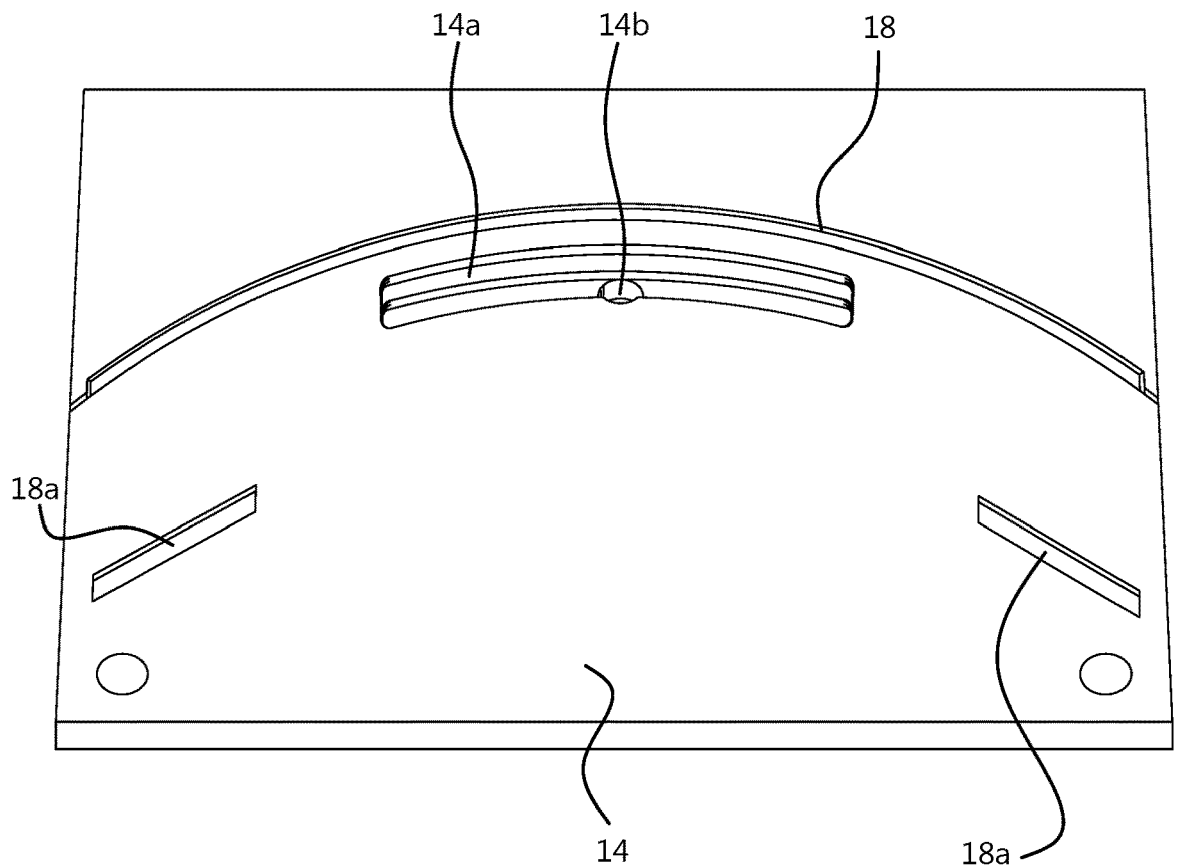
FIG. 3 shows a bottom view of a slurry recollection unit as used in an embodiment of the present invention.

The suction aperture 14a, in a further embodiment has a structural form congruent with the scraper 18, i.e. it's shape is curved. A single communicating attachment 14b for further slurry transport (e.g. connected to downstream feed line 15 as shown in FIG. 1) is provided in the center of the suction aperture 14a. This ensures that the remaining slurry is always transported as much as possible towards the communicating attachment 14b, preventing any 'dry' running of the downstream feed line 15. As an alternative, or additionally, further communicating attachments may be provided next to the single centrally located communication attachment 14b as shown in the embodiment of FIG. 3.

In an embodiment, the resin collection unit 14 comprises an output resin storage unit 19, which allows excess resin to be collected continuously during additive manufacturing while the scraper 18 removes excess resin from the foil substrate 2 as it moves along the support plate 8 into the resin collection unit 14. The output resin storage unit 19 enables buffering of an amount of excess resin up to a desired output level L2, wherein the buffered excess resin is pumped by the pump unit 16 from the resin collection unit 14 through the downstream and upstream feed line 15, 17 into the input storage unit 5 of the resin depositor 4.

In an advantageous embodiment, the resin depositor 4 further comprises a variable height blade 20, e.g. a doctor blade, for providing the layer of curable resin 6 on the foil substrate 2 with an accurately defined thickness d. The variable height blade 20 allows for a smooth and even layer of curable resin 6 having a predetermined thickness d across a width of the foil substrate 2. In an embodiment the input resin storage unit 5 comprises an amount of filtered curable resin up to an input level L1 to ensure that a continuous layer of curable resin 6 having the predetermined thickness can be provided by the variable height blade 20. In an embodiment, the input level L1 is larger than the predetermined thickness d of the layer of curable resin 6.

Figure 4:
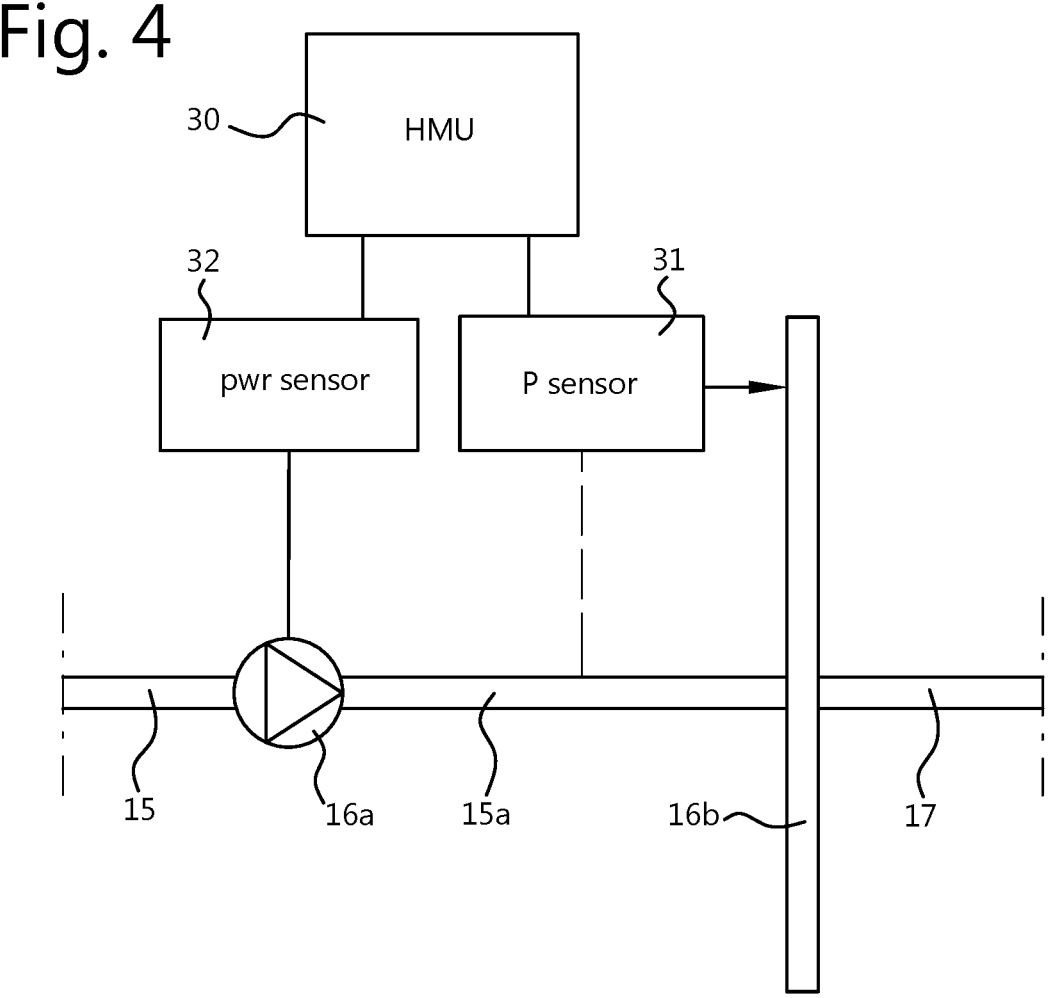
FIG. 4 shows a schematic diagram of a health monitoring unit arrangement.

FIG. 4 shows a schematic diagram of a health monitoring unit arrangement, which may be applied to any of the additive manufacturing device embodiments described herein. A non-invasive health monitoring unit 30 is provided which is in operational communication with the resin conditioning unit 16. The health monitoring unit is of the non-invasive type due to the high viscosity nature of the slurry used in operation of the additive manufacturing device. Advantage of non-invasive measurements is further that there is no contact with the slurry in operation, preventing any fouling or otherwise disadvantageous interaction with the slurry. The health monitoring unit 30 is arranged to provide on-condition monitoring of (parts of) the resin conditioning unit 16, such as the pump unit 16a and/or filter unit 16b as shown in the embodiment of FIG. 4 (with a connecting feed line 15a between the pump unit 16a and filter unit 16b). As an example, by monitoring a pressure in or a pressure difference over the pump unit 16a and/or filter unit 16b, degradation of the respective part of the resin conditioning unit 16 can be detected. On condition monitoring and replacement of a part only when necessary has of course cost advantages when using the present invention additive manufacturing device. Also, the health monitoring unit 30 can be arranged to provide timely warnings of abnormal measurements, which e.g. allows to take preventive action to the additive manufacturing apparatus (e.g. switch-off) before any damage may occur.

The health monitoring unit 30 as shown in the embodiment of FIG. 4 is provided with a power sensor 32 connected to the pump unit 16*a*, and a pressure sensor 31 in communication with the filter unit 16*b*. Alternatively, the pressure sensor 31 is in communication with the connecting feed line 15*a*, also for a non-invasive pressure measurement as discussed in more detail below.

The health monitoring unit 30 is arranged to store measurement data and to process measurement data, e.g. to detect anomalies, trends in sensor parameters, etc. Depending on the condition detected, appropriate indication can be given to an operator of the additive manufacturing apparatus, e.g. via a display or warning components.

The pressure sensor 31 can be implemented in a number of exemplary non-invasive embodiments. E.g. the displacement of a filter housing of the filter unit 16*b* can be measured using a displacement sensor, e.g. by mechanical measurement, optical measurement, (ultra-)sonic measurement. This may also be applied to other parts of the filter unit 16*b* which bend or deform under the influence of pressure, using a direct measurement, e.g. using strain gauges, or indirectly, e.g. using a load cell mechanically connected to the filter unit 16*b*. Similar arrangements can be applied to the pump unit 16*a*, or to other elements which are part of the resin conditioning unit 16. Furthermore, the connecting feed line 15*a* may be selected to have a predetermined flexibility, such that in increase of the diameter of the connecting feed line 15*a* may be a direct measure of the pressure in the connecting feed line 15*a*.

To monitor a pressure increase in the slurry feed lines 15, 15*a*, 17, which e.g. would indicate a clogged filter unit 16*b*, it is also possible to monitor the power consumed by the pump unit 16*a*. Increased pressure will necessitate a higher pump action which will show as an increased power consumption over time. For certain types of pumps, it is also possible to monitor the operating frequency or rpm, e.g. when using a peristaltic pump as pump unit 16*a*. More general, by measuring and monitoring the pressure over the pump unit 16*a* as well as further characteristics (e.g. vibration), it would also be possible to warn the operator of a too high a pollution of the pump unit 16*a*, or of an increased wear of (part of) the pump unit 16*a*.

In view of the above, it is thus possible with only a limited number of additional components to provide a very reliable heath monitoring arrangement for the additive manufacturing apparatus. It will allow to monitor the volume flow of the slurry in the device, and warn for possible leakages or loss of slurry. Furthermore, when present, the filter unit 16*b* can be monitored and replaced only when necessary (because of fouling or other conditions lowering the working of the filter unit 16*b*). Furthermore, the pump unit 16*a* can be monitored for proper functioning as well. In addition, it would even be possible to determine and monitor the viscosity value of the slurry in the additive manufacturing device using the appropriate measurements and processing in the health monitoring unit 30.

In view of the invention, an additive manufacturing process requires that the layer of curable resin 6 is locally subjected to radiation so as to locally solidify the layer according to a desired cross sectional shape of the object 12. The radiation source 10 is therefore arranged to project a particular image of radiation onto the layer of curable resin 6 representing a cross sectional slice of the object 12 to be solidified. To efficiently project a cross sectional image, an embodiment is provided wherein the radiation source 10 comprises a single projector. The single projector is arranged to project an entire cross sectional image at once onto the layer of curable resin 6, so that there is no need to project and combine multiple images to fully cover the cross sectional image in question. In an advantageous embodiment, the single projector of the radiation source 10 comprises a 4K beamer device, e.g. a 4K DLP or UHD beamer device, which is capable of projecting a complete cross sectional image with sufficient resolution and radiation energy onto the layer of curable resin 6 at once. This eliminates the need to project and combine a plurality if images, which is often the case with prior art additive manufacturing devices.

Figure 2:
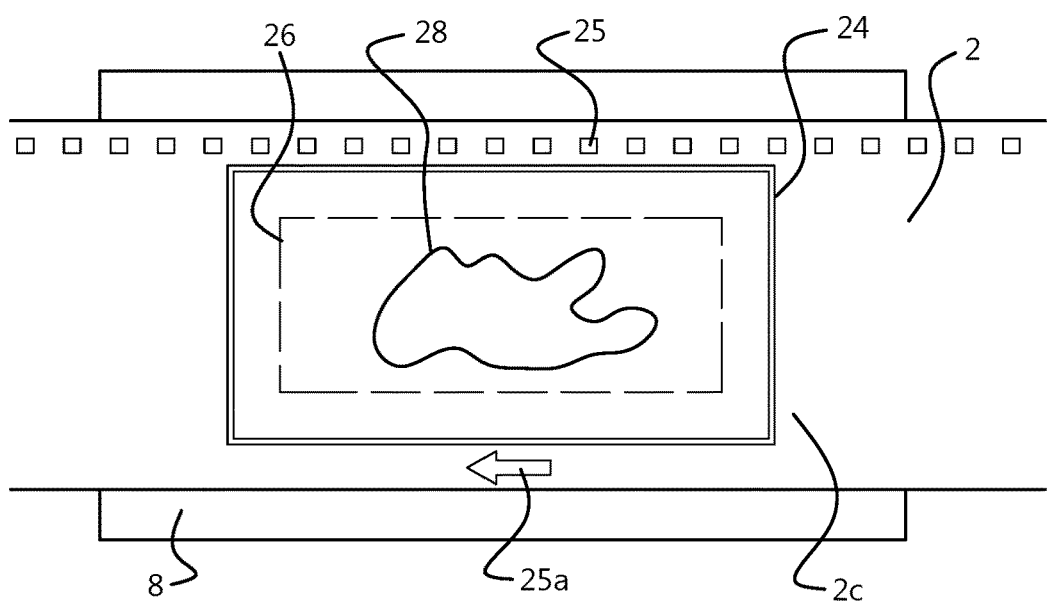
FIG. 2 shows a top view of an embodiment of a support plate and foil substrate as used in the present invention embodiments.

FIG. 2 shows a top view of an embodiment of a support plate 8 and foil substrate 2 as used in present invention embodiments. In the embodiment shown, the foil substrate 2 is moveably disposed on the support plate 8 and in sliding engagement therewith. The radiation source 10 (not shown) defines a maximum usable projected region 26 on the foil substrate 2, i.e. the layer of curable resin, that can be subjected to a projected image 28, of which a contour is drawn in FIG. 2. In case the radiation source 10 comprises a high resolution beamer device, such as a 4K UHD/DLP beamer, then the maximum usable projected region 26 can be projected at once, without projecting a plurality of images for covering the entire usable region 26.

To obtain a substantially flat and smooth cross sectional slice of the object 12, it is desirable that the foil substrate 2 is kept flat against the support plate 8 as close and smooth as possible to reduce surface irregularities on cured cross sectional slices caused by e.g. wrinkles and creases in the foil substrate 2, at least over the entire area of the maximum usable projected region 26. In an embodiment the additive manufacturing device 1 may therefore comprise a foil flattening device for keeping the foil substrate 2 flat onto the support plate 8. The foil flattening device prevents wrinkles, ridges, creases and the like in the foil substrate 2 to ensure that the cross sectional slice to be cured is flat and smooth.

In an advantageous embodiment, the support plate 8 may comprise a vacuum device provided with one or more apertures or slits 24 disposed along the support plate 8, e.g. as a single slit surrounding the exposure area of the support plate 8 (i.e. the maximum usable projected region 26), as shown in the exemplary embodiment depicted in FIG. 2. The one or more apertures or slits 24 are configured for providing a lower pressure between the support plate 8 and the foil substrate 2 than the atmospheric pressure surrounding the additive manufacturing device 1. As a result the foil substrate 2 is held close and flat against the support plate 8.

In an embodiment the one or more apertures or slits 24 of the vacuum device are arranged along a foil edge zone 2*c* outside the maximum usable projected region 26, so that the one or more apertures or slits 24 do not interfere with a projected image 28. It is of course possible that in an alternative embodiment the one or more apertures and slits 24 of the vacuum device completely enclose the maximum projected usable region 26, which would also result in non-interference of the one or more apertures or slits 24 with the projected image 28.

Providing a lower pressure between the foil substrate 2 and the support plate 8 may be combined with heating the foil substrate 2 to allow for an optimized placement of the foil substrate 2 on the support plate 8 as well as attaining an optimized viscosity of the layer of curable resin 6 during a additive manufacturing process. In an advantageous embodiment the support plate 8 may comprise a vacuum device and a heating device. The heating device may also be used to loosen the foil substrate 2 when solidification of a cross sectional slice is completed. For example, in an embodiment the heating device comprises a blower arranged for blowing warm air between the foil substrate 2 and the support plate 8.

In an alternative embodiment the vacuum device may also provide an increased pressure between the support plate 8 and the foil substrate 2 for loosening it. So the one or more apertures or slits 24 may also be utilized for both sucking air from a space between the foil substrate 2 and the support plate 8 as well as blowing air in this space to loosen the foil substrate 2 when required.

Figure 5:
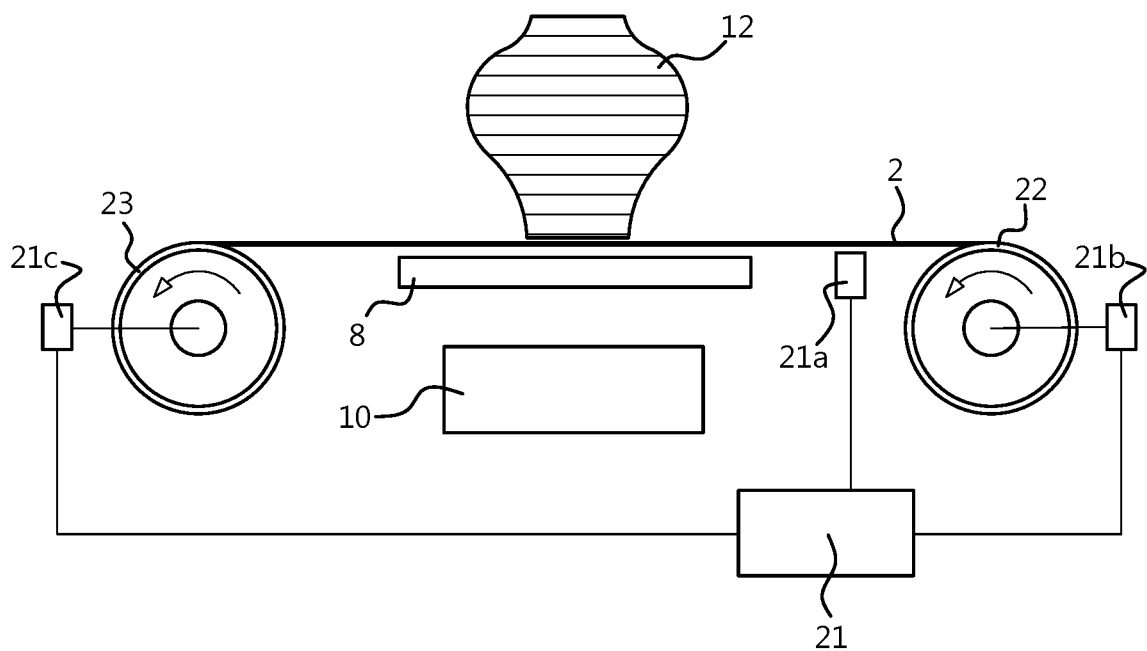
FIG. 5 shows a partial view of a further embodiment of the present invention additive manufacturing apparatus comprising a foil substrate control unit.

FIG. 5 shows a partial view of a further embodiment of the present invention additive manufacturing apparatus comprising a foil substrate control unit 21. In this exemplary embodiment, the foil substrate 2 is transporting the layer of curable resin 6 to a position above the transparent plate 8 in order to from a new layer on the object 12 using the radiation source 10. The foil substrate 2 is moving from a source roll 22 to a used foil roll 23, under control of the foil substrate control unit 21 (e.g. using appropriate encoders 21b, 21c and actuators/motors being part of the source roll 22 and/or used foil roll 23).

In this embodiment the foil substrate 2 comprises a foil substrate marking 25 on a side part of the foil substrate 2, e.g. extending aside the part of the foil substrate 2 on which the layer of curable resin 6 is carried in operation (e.g. a 100 mm wide line centered on the foil substrate 2). This is also depicted in the embodiment of FIG. 2. The foil substrate marking 25 is machine readable by a marking sensor 21a connected to the foils substrate control unit 21, e.g. the foil substrate marking 25 is printed as a regular pattern of blocks detectable by an optical sensor embodiment of the marking sensor 21a. Also other combinations of foil substrate marking 25 and a suitable marking sensor 21a may be provided, such as magnetic code and sensor. If the foil substrate marking 25 is provided on the edge part of the foils substrate 2, the marking sensor 21a can be positioned at a suitable location in an easy manner. The foil substrate marking 25 may also comprise (further) human readable markings 25a, e.g. arrows which can aid in properly loading of a fresh roll of foil substrate 2 in the additive manufacturing device.

The foil substrate marking 25 may a regular spaced series of (white) blocks, spaced apart (e.g. 6 mm blocks spaced at a pitch distance of 12 mm). Also other series or sequences can be envisaged, e.g. allowing a finer measurement, or allowing a direction of movement determination using the foil marking sensor 21a and foil substrate control unit 21. The foil substrate control unit 21 may be arranged to have a storage function, which would e.g. allow to keep record of how much length of a source roll 22 has been used. This would also allow to calculate whether the remaining amount of foils substrate 2 is sufficient for completing a specific task of printing the object 12 completely. Furthermore, the foil substrate unit 21 may be arranged to calculate and control advancement of the foil substrate 2 depending on specific characteristics of the object being printed, e.g. in order to advance the foils substrate 2 just sufficient to have a sufficiently large fresh layer of curable resin 6 to from the next layer. This will diminish the amount of foil substrate 2 used for completing an object 12, but will also ensure less use of the slurry for the layer of curable resin 6, e.g. also resulting in less wear of other components of the additive manufacturing device. This will be advantageous in efficient use of resources for completing additive manufacturing of the object 12, including material use but also the required presence of a human operator. The embodiments described herein are applicable to all types of additive manufacturing devices, e.g. both the foil substrate 2 and support plate 8 can be transparent or not, and the radiation source 10 can also be of a different type and positioned differently than described in the exemplary embodiments in this description.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. An additive manufacturing device for manufacturing a three dimensional object, comprising
   a planar foil substrate and a resin depositor for depositing a layer of curable resin on a first side of the planar foil substrate, the planar foil substrate being supported by a support plate;
   a radiation source for radiation curing the resin layer on the first side of the planar foil substrate, wherein a cured resin layer represents a cross sectional slice of a three dimensional object;
   a stage configured to hold a stacked arrangement of one or more cured resin layers representing at least in part the three dimensional object;
   a positioning system for relative positioning the planar foil substrate and the stage;
   wherein the resin depositor comprises an input side resin storage unit, the additive manufacturing device further comprising:
   a resin collection unit arranged to collect unused curable resin from the substrate, and
   a resin conditioning unit upstream from the input side resin storage unit and comprising a resin humidity control system, wherein the resin conditioning unit is in communication with the resin collection unit and the input side resin storage unit, and
   wherein the resin collection unit comprises a scraper having curvature along a scraping edge, and wherein the scraper is in contact engagement with the planar foil substrate.

2. The additive manufacturing device according to claim 1, wherein the resin collection unit comprises a suction aperture located centrally with respect to the curvature of the scraper.

3. The additive manufacturing device according to claim 1, wherein the resin depositor further comprises a variable height blade for setting a thickness of the layer of curable resin on the foil substrate.

4. The additive manufacturing device according to claim 1, wherein the radiation source comprises a single projector.

5. The additive manufacturing device according to claim 1, further comprising a foil flattening device for keeping the planar foil substrate flat onto the support plate.

6. The additive manufacturing device according to claim 1, wherein the resin conditioning unit further comprises a pump unit in communication with the input side resin storage unit.

7. The additive manufacturing device according to claim 1, wherein the resin conditioning unit further comprises a filter unit.

8. The additive manufacturing device according to claim 7, wherein the filter unit has a filter aperture size which is smaller than a thickness of the layer of curable resin.

9. The additive manufacturing device according to claim 1, wherein the resin conditioning unit further comprises a resin temperature control system.

10. The additive manufacturing device according to claim 1, wherein the resin conditioning unit further comprises a resin viscosity control system.

11. The additive manufacturing device according to claim 1, wherein the resin conditioning unit further comprises a resin ingredient control system.

12. The additive manufacturing device according to claim 1, further comprising a non-invasive health monitoring unit in operational communication with the resin conditioning unit.

13. The additive manufacturing device according to claim 1, wherein the planar foil substrate comprises a foil substrate marking, and the additive manufacturing device further comprising a foil substrate control unit.

14. The additive manufacturing device according to claim 7, wherein the filter unit has a filter aperture size which is less than 50 μm.

15. An additive manufacturing device for manufacturing a three dimensional object, comprising
 a planar foil substrate;
 a resin depositor for depositing a layer of curable resin on a first side of the foil substrate, the resin depositor comprising an input side resin storage unit and a variable height blade which sets the thickness of the curable resin on the first side of the foil substrate by controlling the amount of curable resin which can exit the resin storage unit, the thickness being the height between the blade and the foil substrate;
 a radiation source for radiation curing the resin layer on the first side of the foil substrate, wherein a cured resin layer represents a cross sectional slice of a three dimensional object;
 a stage configured to hold a stacked arrangement of one or more cured resin layers representing at least in part the three dimensional object;
 a positioning system for relative positioning the foil substrate and the stage;
 a resin collection unit arranged to collect unused curable resin from the substrate, and
 a resin conditioning unit upstream from the input side resin storage unit and comprising a resin humidity control system, wherein the resin conditioning unit is in communication with the resin collection unit and the input side resin storage unit, wherein the resin collection unit comprises a scraper having curvature along a scraping edge, and wherein the scraper is in contact engagement with the planar foil substrate.

16. The additive manufacturing device of claim 15, wherein the resin storage unit comprises amount of filtered curable resin to a level L1, and the variable height blade sets the thickness of the layer of curable resin exiting the resin storage unit onto the first side of the foil substrate to a thickness of less than L1.

17. The additive manufacturing device according to claim 1, wherein the curvature results in a substantially V-shaped scraper.

18. The additive manufacturing device according to claim 5, wherein the foil flattening device comprises one or more of: a vacuum device with apertures or slits in the support plate; and a blower directed between the foil substrate and the support plate for loosening the foil substrate before moving the foil substrate for manufacturing a further layer.

* * * * *